(12) United States Patent
Lemoine et al.

(10) Patent No.: US 12,397,515 B2
(45) Date of Patent: Aug. 26, 2025

(54) METHOD FOR INTEGRATING A STIFFENER INTO A THERMOPLASTIC MATRIX COMPOSITE PART

(71) Applicant: DAHER AEROSPACE, Oely (FR)

(72) Inventors: Ivain Lemoine, Vallet (FR); Julie Vaudour, Pont Saint Martin (FR)

(73) Assignee: DAHER AEROSPACE, Orly (FR)

( * ) Notice: Subject to any disclaimer, the term of this patent is extended or adjusted under 35 U.S.C. 154(b) by 142 days.

(21) Appl. No.: 18/518,171

(22) Filed: Nov. 22, 2023

(65) Prior Publication Data
US 2024/0165898 A1 May 23, 2024

(30) Foreign Application Priority Data
Nov. 23, 2022 (FR) ..................................... 2212239

(51) Int. Cl.
| | |
|---|---|
| B29C 70/74 | (2006.01) |
| B29C 70/38 | (2006.01) |
| B29C 70/42 | (2006.01) |
| B29K 71/00 | (2006.01) |
| B29K 105/08 | (2006.01) |
| B29K 307/04 | (2006.01) |

(52) U.S. Cl.
CPC ............ B29C 70/74 (2013.01); *B29C 70/382* (2013.01); *B29C 70/42* (2013.01); *B29K 2071/00* (2013.01); *B29K 2105/0872* (2013.01); *B29K 2307/04* (2013.01); *B29K 2995/0012* (2013.01)

(58) Field of Classification Search
CPC ..................................................... B29C 70/74
See application file for complete search history.

(56) References Cited

U.S. PATENT DOCUMENTS

| | | | |
|---|---|---|---|
| 9,193,433 B2 * | 11/2015 | Hugon | ................. B29C 66/474 |
| 2014/0079903 A1 | 3/2014 | Hugon et al. | |
| 2016/0375629 A1 | 12/2016 | Matsen et al. | |

FOREIGN PATENT DOCUMENTS

EP    3112131 A1    1/2017

OTHER PUBLICATIONS

"Victrex and Safran Cabin to launch flexible composite platform for multiple aircraft bracket projects", Sep. 23, 2019, 5 pages.*
Luinge et al Low Mlet PAEK (LM PAEL) Prepreg for Improving Processing of Thermoplastic Composites, SAMPE Conference Proceedings, Charlotte, NC, May 20-23, 2019.*

* cited by examiner

Primary Examiner — Jeffry H Aftergut

(57) ABSTRACT

The invention pertains to a composite part with a fibrous reinforcement and a thermoplastic polymer matrix, comprising:
  substrate part with a matrix of a first thermoplastic polymer having a first melting temperature;
  stiffener made of a composite material with a matrix of a second thermoplastic polymer having a second melting temperature; comprising the steps of:
    obtaining an unconsolidated preform of the substrate part;
    obtaining a preform of the stiffener;
    integrating a layer of the first thermoplastic polymer into the preform of the stiffener at a location configured to be in contact with the substrate part; and
    subjecting the substrate part and the preform of stiffener to a thermomechanical cycle so as to consolidate the substrate part and weld the stiffener to the substrate part.

16 Claims, 9 Drawing Sheets

METHOD FOR INTEGRATING A STIFFENER INTO A THERMOPLASTIC MATRIX COMPOSITE PART

RELATED APPLICATIONS

This application claims priority of French application #FR221239 filed on Nov. 23, 2022 the content of which is hereby introduced by reference in its entirety.

TECHNICAL FIELD

The invention belongs to the field of implementation of composite materials with a thermoplastic polymer matrix. More particularly, the invention relates to the integration of stiffeners on thermoplastic polymer matrix composite parts, such as a stiffened panel comprising a skin and stiffeners in the form of profiles on at least one of its faces, a spar comprising stiffeners or system fixing interfaces between its flanges. Such parts are in particular, but not exclusively, used in the aeronautical field.

BACKGROUND ART

Document EP 2 709 839/U.S. Pat. No. 9,193,433 describes a method for manufacturing a stiffened panel comprising a composite skin with fibrous reinforcements in a thermoplastic polymer matrix, stiffened by profiles stiffeners, also made of a composite material with fibrous reinforcement in a thermoplastic polymer matrix.

According to this method of the prior art, the skin is laid up by integrating therein at the locations of the stiffeners to be assembled with the skin, films of a thermoplastic polymer having a melting temperature lower than the melting temperature of the polymer making the matrix of the skin.

The skin thus laid up is consolidated.

The stiffeners are manufactured and consolidated, they comprise a thermoplastic polymer matrix a melting temperature which is higher than a melting temperature of the thermoplastic films that were integrated into the skin at the chosen locations.

The assembly is carried out by pressing the consolidated stiffeners onto the consolidated skin, the stiffeners being pressed onto the skin at the locations of the films, and the whole set is then heated to a temperature higher than the melting temperature of the thermoplastic films, but lower than the melting temperatures of the polymers making the matrices of the stiffeners and of the skin.

Thus, the assembly of the stiffeners with the skin is carried out via thermoplastic films locally integrated into the matrix, this assembly is all the more effective when the thermoplastic polymer the films are made of is miscible in the polymer making the matrix of the skin and in the polymer making the matrix of stiffeners.

This method is overall satisfactory but exhibits some drawbacks.

Thus, it requires an additional thermal cycling in order to carry out the assembly.

To be able to carry out the assembly without deconsolidating either the skin or the stiffeners, the thermoplastic polymer selected for the films shall be both miscible in the polymer making the matrix of the skin and in the polymer making the matrix of the stiffeners, and its melting temperature shall be much lower than those of these polymers.

By way of example, if the polymer making the matrix of the skin and the matrix of the stiffeners is a polyetheretherketone (PEEK) whose melting point is 343° C., document EP 2 709 839/U.S. Pat. No. 9,193,433 teaches selecting a polyetherimide (PEI), whose melting point is of the order of 219° C., for the assembly films.

This large difference in melting temperatures does not make it possible to ensure the miscibility of polymers at the interface of the assembly, the latter essentially exhibiting the properties of the PEI polymer.

The skin and the stiffeners being in the consolidated state when the assembly is carried out, and being heated well below their melting temperatures, the latter remain rigid and any difference in shape between the skin and the stiffeners must be absorbed in the thickness of the assembly film, which is not always possible, particularly for panels of complex shape and large dimensions.

There are also other methods of the prior art where the skin and the stiffeners are co-consolidated or deconsolidated and then reconsolidated during the assembly. These methods have the disadvantage of requiring a complex tooling to allow the application of a uniform pressure in all the directions required for the consolidation of both the stiffeners and the skin.

Document US 2018/0319102 describes a method for the manufacturing of a composite part with fibrous reinforcement and thermoplastic polymer matrix consisting in obtaining by automated fiber placement a non-consolidated laminate preform, the layup of fibers being carried out at a temperature and a deposition rate such that the plies are welded to one another without the molecular chains of the polymer making the thermoplastic matrix passing through the interfaces between the plies.

The preform made according to this method has a very low porosity ratio, less than 1%, being enough cohesive and stiff to be easily handled, but only reaches its expected technical characteristics once consolidated, meaning that it has to be subjected to a cycle of temperature and pressure so that molecular chains of the thermoplastic polymer making the matrix of the preform, develop and extend across the interlaminar interfaces.

Document EP 3 096 940/U.S. Pat. No. 10,773,470 also describes a method for obtaining a preform that is not consolidated but suitable for stamping a continuous fiber reinforced composite with a thermoplastic polymer matrix in which unidirectional plies pre-impregnated with a thermoplastic polymer are being assembled by heating, the thermoplastic polymer showing a recrystallization temperature between its glass transition temperature and its melting temperature, the heating being performed at a temperature comprised between the recrystallization temperature and the melting temperature.

The very advantage of these direct stamping methods, without an intermediate step of consolidating a preform or a blank before the stamping, is lost if the stiffeners are deconsolidated when they are assembled with the skin.

Document EP 3 112 131 discloses a method and an apparatus for welding a composite structure, the apparatus comprising a base, a cover and a channel, the channel being configured to hold a stiffener and the cover being configured to hold a composite part to be welded with the stiffener.

SUMMARY OF THE INVENTION

The invention aims at solving the drawbacks of the prior art and to this end pertains to a method for the manufacturing of a composite part with a fibrous reinforcement and a thermoplastic polymer matrix, the composite part comprising: —a substrate part made of a composite material with continuous fibrous reinforcement in a matrix made of a first thermoplastic polymer having a first melting point comprised in a first melting temperature range; —a stiffener integral with the substrate part made of a fibrous-reinforced composite material in a matrix made of a second thermoplastic polymer, the stiffener comprising a flange and a web, the second thermoplastic polymer having a second melting point comprised in a second melting temperature range; wherein: —the second melting point is higher than the first melting point—the first thermoplastic polymer is miscible with the second thermoplastic polymer at the second melting point; the method comprising the steps of:

I) obtaining a non-consolidated preform of the substrate part;

II) obtaining a preform of the stiffener comprising a layer comprising the first thermoplastic polymer at a location of a flange of the stiffener configured to be in contact with the substrate part;

III) placing and assembly of the non-consolidated preform of the substrate part and the preform of the stiffener contacting the substrate part in a tooling comprising a molding surface reproducing a shape of the substrate part and comprising means for positioning the stiffener relative to the molding surface; and IV) subjecting the assembly to a consolidation thermo-mechanical cycle comprising heating under pressure up to a first temperature that is higher than the first melting temperature range but lower than the second melting temperature range in order to consolidate the preform of the substrate part and to weld the flange of the stiffener on the substrate part.

In comparison with the prior art, this method eliminates a thermal cycle, the substrate part being consolidated in contact with the stiffener. In addition, this consolidation step of the substrate part makes it possible to compensate, at least partially, the shape differences between the substrate part and the stiffener.

Since the consolidation of the substrate part is carried out at a temperature lower than the melting temperature range of the polymer making the matrix of the stiffener, if the latter may undergo a certain softening which helps shape adaptation, it is not deconsolidated during this operation and retain a certain rigidity as well as its structural integrity.

Thus, this method allows both a gain in terms of productivity, by eliminating a thermal cycling step, and a gain in terms of simplification of the tooling since it does not require a specific tooling to maintain the stiffener in its shape during its assembly with the substrate part, because the stiffener is not deconsolidated.

The invention may be carried out according to the embodiments and variants exposed hereafter, which are to be considered individually or according to any technically operative combination.

According to this exemplary embodiment, the first melting temperature range of the first polymer is comprised between 285° C. and 320° C., the second melting temperature range of the second polymer is comprised between 294° C. and 354° C., and the second melting point is 343° C.

Advantageously, the heating temperature is 335° C. This heating temperature gives an optimal result for these materials couple.

According to an embodiment, step v) comprises the interposition of a film made of the first thermoplastic polymer between the flange of the stiffener and the substrate part, the addition of this film thickness makes it possible to ensure a greater effective contact area between the flange and the substrate part, in particular in the presence of micro-geometric defects.

According to an embodiment, the fibrous reinforcement of the stiffener comprises continuous fibers.

According to an embodiment, the fibrous reinforcement of the stiffener comprises long fibers.

According to an embodiment, the fibrous reinforcement of the stiffener comprises short fibers.

According to an embodiment, the substrate part is a skin and the stiffener is a profile, the integration of the stiffener to the skin making a stiffened panel.

According to another embodiment, the substrate part is a profile with a U-shaped section. This embodiment is particularly suitable for the manufacturing of a wing spar or a fuselage frame of an aircraft by integrating therein functions such as brackets or elements supporting operating members.

According to this embodiment, step i) comprises a layup by automated fiber placement of fibers pre-impregnated with the first thermoplastic polymer on the molding surface of the tooling so as to make a non-consolidated preform of the substrate part.

Advantageously, the layup by automatic fiber placement of pre-impregnated fibers of the first thermoplastic polymer is carried out while the consolidated stiffener is placed in the stiffener's positioning means so that the stiffener's flange is flush with the molding surface. This embodiment is more productive and makes it possible to further improve the shape adaptation between the stiffener and the skin.

According to an embodiment step II) may comprise the steps of:

obtaining a non-consolidated preform of the stiffener;

integrating a layer made of the first thermoplastic polymer into the non-consolidated preform of the stiffener at a location of a flange of the stiffener configured to be in contact with the substrate part; and consolidating the non-consolidated preform of the stiffener comprising the layer made of the first thermoplastic polymer, thus obtaining the preform of the stiffener.

According to an embodiment, the stiffener may be obtained by a method comprising the steps of:

laying up on flat a non-consolidated preform of the stiffener by automated fiber placement;

hot-stamping the non-consolidated preform and consolidating the stiffener during the stamping.

This embodiment makes it possible to obtain a stiffener whose reinforcement directions are parallel to at least one of the curvatures of the substrate part, in particular the skin of a stiffened panel, so as to improve its rigidity and buckling resistance.

According to this embodiment, the flat lay up step of the unconsolidated preform of the stiffener comprises a layup of a ply comprising fibers pre-impregnated with the first thermoplastic polymer.

According to another embodiment, the stiffener is obtained by a pultrusion operation.

According to yet another embodiment, the stiffener is obtained by a process chosen from injection molding, additive manufacturing and thermo-compression.

BRIEF DESCRIPTION OF THE DRAWINGS

The invention is implemented according to the preferred embodiments, in no way limiting, exposed hereafter with reference to FIGS. 1 to 13 in which.

DESCRIPTION OF EMBODIMENTS

Example 1: Stiffened Panel

Figure 1:
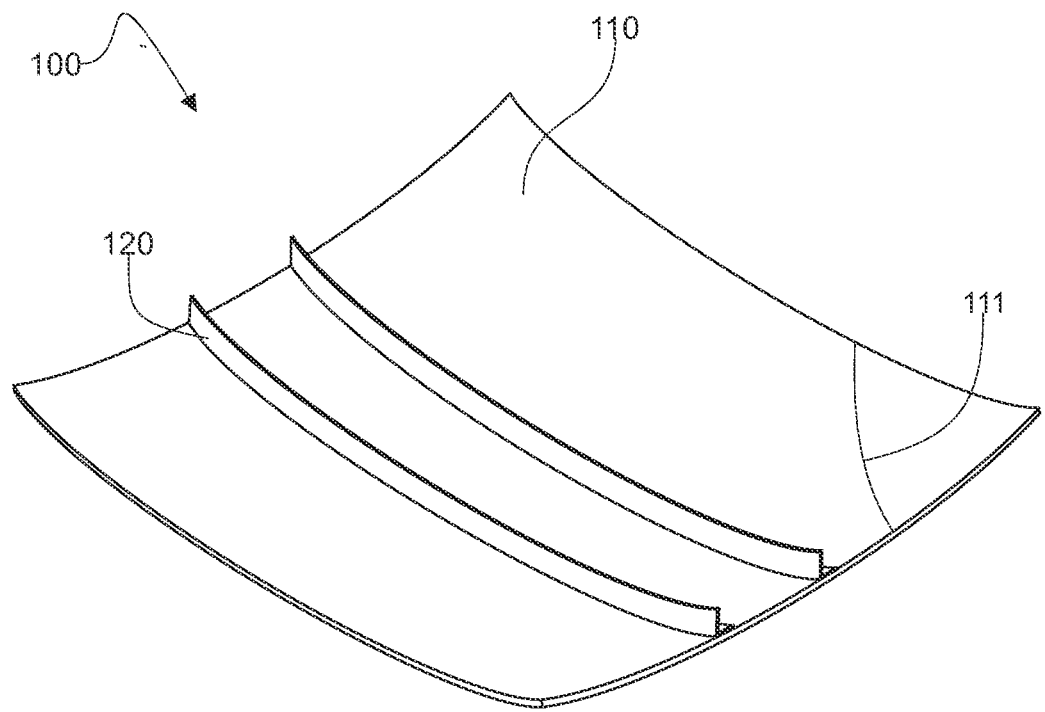
FIG. 1 shows in a perspective view an exemplary embodiment of a stiffened panel.

FIG. 1 the invention pertains to the manufacturing of a thermoplastic matrix composite part comprising a stiffener, as a non-limiting example, it is a stiffened panel (100). Such a panel comprises a thin skin (110), which is made integral with one or more stiffeners (120).

The method makes it possible to make such a stiffened panel of any shape and any size, covering an area from less than 1 m² up to an area of several tens of m².

The skin (110) is said to be thin when its thickness is less than $1/1000^{th}$ of the smallest of its other dimensions, width or length.

It may be a laminate composite comprising several continuous fibrous plies, that is to say the fibers (111) of which are extending from one edge to another edge other of the skin, in a matrix made of a first thermoplastic polymer.

By way of non-limiting example, the skin (110) may comprise 24 plies of carbon fibers, for a thickness of 3.2 mm, in a matrix of a so-called low-melting-point polyaryletherketone (PAEK) polymer (Low Melt) designated commercially as LMPAEK®.

According to exemplary embodiments, the skin (110) may be flat, shaped according to a portion of a cylinder or of a cone, shaped according to a constant or evolving double curvature in one or two directions.

The stiffeners (120) are also made of a fiber-reinforced thermoplastic matrix composite. According to embodiment variants said reinforcing fibers may be continuous fibers, long fibers or short fibers, alone or in combination.

As a first approximation the short fibers have a slenderness $s=l/d$ where l is the length of the fiber and d its diameter, less than 500 and the long fibers are staple fibers with a slenderness greater than 500. In plastic injection molding, short fibers are generally less than 2 mm long and the long fibers are more than 2 mm but less than 10 mm long to allow them to be integrated into the injection compound.

Figure 2:
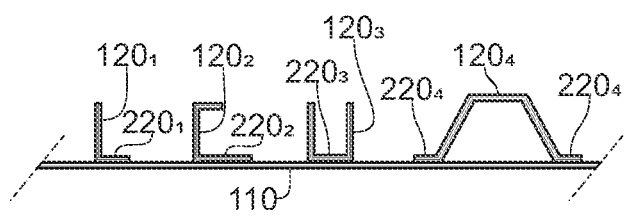
FIG. 2 shows different sections of stiffeners according to a cross-sectional view.

FIG. 2 according to a non-limiting exemplary embodiment, the stiffener may be in the shape of a profile whose section comprises at least two wings, and which comprises 24 plies comprising continuous carbon fibers, for a thickness of 3.2 mm, in a matrix made of a second thermoplastic polymer, for example of the polyetheretherketone (PEEK) type.

According to exemplary embodiments, a section of the stiffener may be L-shaped ($120_1$), C-shaped ($120_2$), U-shaped ($120_3$) or Ω-shaped (Greek letter Omega $120_4$) without these examples being limiting.

At least one of the wings of the stiffener section constitutes a flange ($220_1$, $220_2$, $220_3$, $220_4$) by which the stiffener is bonded to the skin (110).

Profiles having these sections ($120_1$, $120_2$, $120_3$, $120_4$) may be obtained by stamping a preform, cut from a preconsolidated plate, or from a non-consolidated preform obtained by automated fiber placement according to the method described in document US 2018/0319102 or by layup according to the method disclosed in EP 3 096 940/U.S. Pat. No. 10,773,470.

According to an embodiment, the stamping operation of the stiffener ends with a consolidation in shape of the stiffener regardless of the starting preform.

Alternatively, the stiffener may be obtained by another method such as pultrusion or consolidation in shape of a pre-impregnated preform, obtained by braiding or knitting of commingled fibers, or any other method known from the prior art.

Whatever the manufacturing method, for the implementation of the instant method, the stiffener (120) is in a consolidated state at the time of its assembly with the skin (110).

A thermoplastic polymer matrix laminar composite is said to be consolidated when the laminate of pre-impregnated plies has been brought to a temperature above the melting point of the thermoplastic polymer making the matrix, while said lamination is subjected to evacuation and pressure in a mold which reproduces the final shape thereof and is then cooled under pressure to a temperature below the glass transition temperature of the thermoplastic polymer making the matrix.

During this pressure-temperature cycle, the molecular chains of the thermoplastic polymer making the matrix develop and cross the interfaces between the plies of the laminate, so that the matrix surrounding the fibrous plies appears homogeneous, the porosities are closed and gas inclusions are evacuated resulting in a porosity content less than 1% or even less than 0.5% in the composite part thus consolidated.

Thus, the consolidation of a composite comprising a matrix made of a thermoplastic polymer comprises three phenomena:

an essentially mechanical phenomenon, which under the effect of the pressure and viscosity of the polymer carried at high temperature tends to create an intimate contact between the plies;

an essentially chemical phenomenon, known as autohesion, which leads to the adhesion of the plies between them by the diffusion of molecular segments through the interface and then throughout the thickness of the plies;

a phenomenon of polymer flow, sometimes referred to as impregnation, which makes it possible to fill the gaps and microcavities remaining in the material.

Since the polymer making the matrix is of the thermoplastic type, the part thus consolidated can be deconsolidated and reconsolidated and may be subjected, for instance, to a shaping operation between the deconsolidation and reconsolidation cycles.

When a part made of a thermoplastic polymer is either not reinforced or reinforced by discontinuous reinforcements, especially short fibers, it can be permanently shaped by being brought to a temperature in its melting temperature range, the polymer softens and becomes plastically deformable.

A thermoplastic matrix composite part reinforced by continuous fibers can only be significantly deformed permanently if it is heated to a temperature high enough for the molten matrix polymer to be fluid enough and to allow interlaminar slipping of the fibers without any pinning point. That is, the composite is heated up to a temperature higher than a melting point as defined, for example, FIG. 6.

The pre-impregnated plies may be layers or rovings of reinforcing fibers of carbon, glass, aramid or other fibrous reinforcements, the thermoplastic polymer is brought in the plies by calendaring the plies with a film of the polymer making the matrix, by commingling the reinforcing fibers with fibers made of the matrix polymer, or by powdering the fibrous plies with the matrix polymer. The assembly of the plies to make the laminar preform requires that the matrix polymer be heated to its melting point, at least locally, the thermoplastic prepregs not exhibiting tackiness at room temperature.

Figure 3:
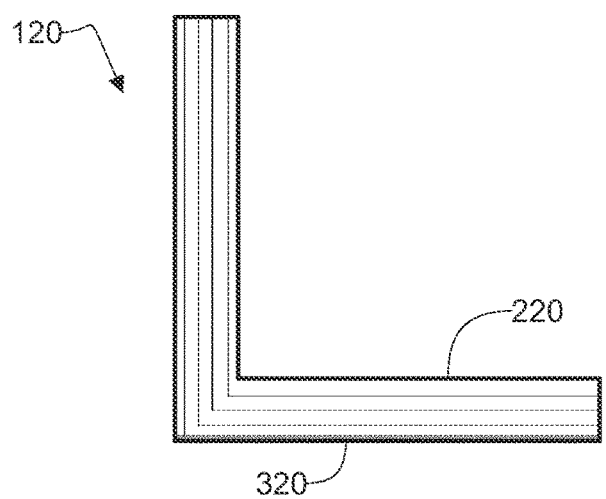
FIG. 3 shows, according to a cross-sectional view, an exemplary embodiment of a stiffener for the implementation of the method of the invention.

FIG. 3 when making the stiffener (120) regardless of its embodiment, a layer (320) comprising the first thermoplastic polymer is introduced on the flange face (220) intended to be assembled with the skin.

The first thermoplastic polymer, for example a LMPAEK®, is selected so as to be miscible in the second thermoplastic polymer, for example a PEEK, making the matrix of the stiffener (120). In addition, this first thermoplastic polymer is selected so that its thermal degradation temperature is higher than the melting point of the second thermoplastic polymer, and finally the first thermoplastic polymer is selected so that its melting point is lower than the melting point of the second thermoplastic polymer.

According to this very example, the melting temperature range of LMPAEK® is comprised between 285° C. and 320° C., which is therefore generally lower than the melting temperature range of PEEK, the latter being comprised between 294° C. and 354° C.

The thermal degradation temperature of LMPAEK® is 400° C., which is higher than the melting point of PEEK.

Thus, the stiffener (120) can be consolidated without the layer (320) comprising the first thermoplastic polymer being degraded during this consolidation.

In addition, due to the miscibility of the first thermoplastic polymer with the second thermoplastic polymer, the layer (320) comprising the first thermoplastic polymer is perfectly integrated with the stiffener at the end of the consolidation operation of the latter.

According to an exemplary embodiment, the layer (320) may be integrated to the face of the flange in the form of a fibrous ply pre-impregnated with the first thermoplastic polymer during the layup of the preform intended to make the stiffener. This fibrous ply may be in the form of a fabric, a nonwoven or unidirectional fibers laid up by automated fiber placement.

This embodiment makes it possible to make the stiffener including the layer comprising the first polymer by stamping.

According to another embodiment, the layer comprising the first polymer may be interposed between the substrate part and the flange of the shaped and consolidated stiffener, the layer comprising one or more non-reinforced films made of the first polymer.

The thickness of the layer (320) made of the first thermoplastic polymer on the face of the flange intended to be in contact with the skin may be comprised between 0.06 mm and 0.15 mm.

Since the stiffener is consolidated, it may be easily machined if necessary for e.g. performing a local routing or thickness reduction as needed.

The preform of the skin may be made according to the same techniques as for obtaining the preform of the stiffener but using fibers pre-impregnated with the first thermoplastic polymer.

More particularly, the preform of the skin is made by automated fiber placement of fibers pre-impregnated with the first thermoplastic polymer, such as LMPAEK®, on a shaped tooling, which makes it possible to give it an identical shape or at least very close to that of the final panel as soon as it is laid up.

The preform thus made, although not consolidated, is cohesive and rigid enough to be handled and transported either manually or by a robot.

Figure 4:
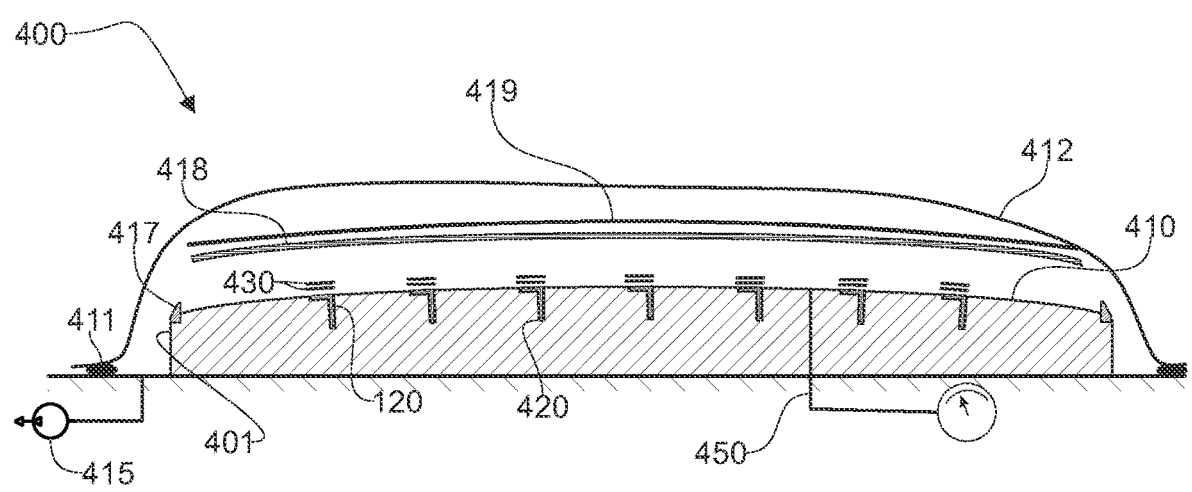
FIG. 4 shows, according to a cross-sectional view, an exemplary embodiment of a tooling for the implementation of the method of the invention.

FIG. 4 the assembly of the stiffeners (120) with the skin preform is performed at the same time as the consolidation of the skin.

To this end, the stiffeners (120) consolidated and comprising the layer of the first polymer on the faces of their flanges, are placed in a tooling (400) comprising a molding surface (410) reproducing a shape (401) of the surface of the stiffened panel to be obtained.

The tooling may comprise grooves (420) configured to receiving and positioning the stiffeners (120) so that their flanges comprising a layer of the first thermoplastic polymer are flush with the molding surface (410).

Advantageously, the shape (401) of the tooling is used as a template for the layup of the preform of the skin. In this case, specific covers (not shown) are used to fill the positioning grooves of the stiffeners.

According to another advantageous embodiment, the preform of the skin (418) is laid up by automated fiber placement on the shape (401) while the stiffeners (120) are in place in the grooves with their flanges (220) flush with the molding surface (410).

This layup may be carried out under the conditions described in document US 2018/0319102 so that although the fibers adhere to the flanges of the stiffeners, the heating does not deconsolidate these flanges, including the layers of the first thermoplastic polymer.

In the two embodiments where the preform of the skin (418) is made by layup on the shape (401) of the tooling, a protective layer, such as a polyimide film or a glass fabric, is placed on the molding surface (410) either over the entire molding surface or between the flanges (220) of the stiffeners placed in the grooves (420), so as to avoid the adhesion of the fibers to the molding surface.

This protective layer is assembled to the molding surface for instance by adhesives. The protective layer may be easily torn out from the surface of the panel before or after the consolidation of the skin.

According to a particular embodiment, regardless of the embodiment of the preform of the skin, one or more films (430) of the first thermoplastic polymer may be interposed between the flanges of the stiffeners and the preform of the skin.

The additional thickness provided by such a film, a few tenths of a millimeter, enables a better adaptation of the actual shapes of the flanges and the of the skin.

A tarpaulin (412) and sealing means (411) make it possible to delimit a sealed enclosure around the shape (401) and the preform of the skin. Pumping means (415) allow this enclosure to be vacuum evacuated.

Advantageously, the tooling comprises a temperature probe (450).

Thus, the preform of the skin being rigid but not consolidated, it may be placed on the shape (401) of the tooling in which the consolidated stiffeners (120) are set, or it may be laid up directly on the shape comprising the consolidated stiffeners that are hold in the grooves (420). The enclosure delimited by the tarpaulin (412) is evacuated, which has the effect of pressing the preform of the skin on the shape (401) of the tooling and on the flanges of the stiffeners.

The tooling comprises wedges (417) throughout the periphery of the shape so as to contain the first polymer that is melted during consolidation. When the shape (401) is also used as a template for the preform of the skin layup, these wedges (417) are advantageously removable and installed in grooves arranged in the tooling. Advantageously, these wedges (417) also make it possible, by their height, to calibrate the thickness of the skin during the consolidation step.

According to a specific embodiment, the tooling may comprise a caul plate (419) between the tarpaulin (412) and the preform of the skin. By way of non-limiting example, the caul plate may be made of a composite of mica in a silicone matrix marketed under the trademark Miglasil®, the latter caul plate being shaped of the shape (401) of the tooling.

Figure 5:
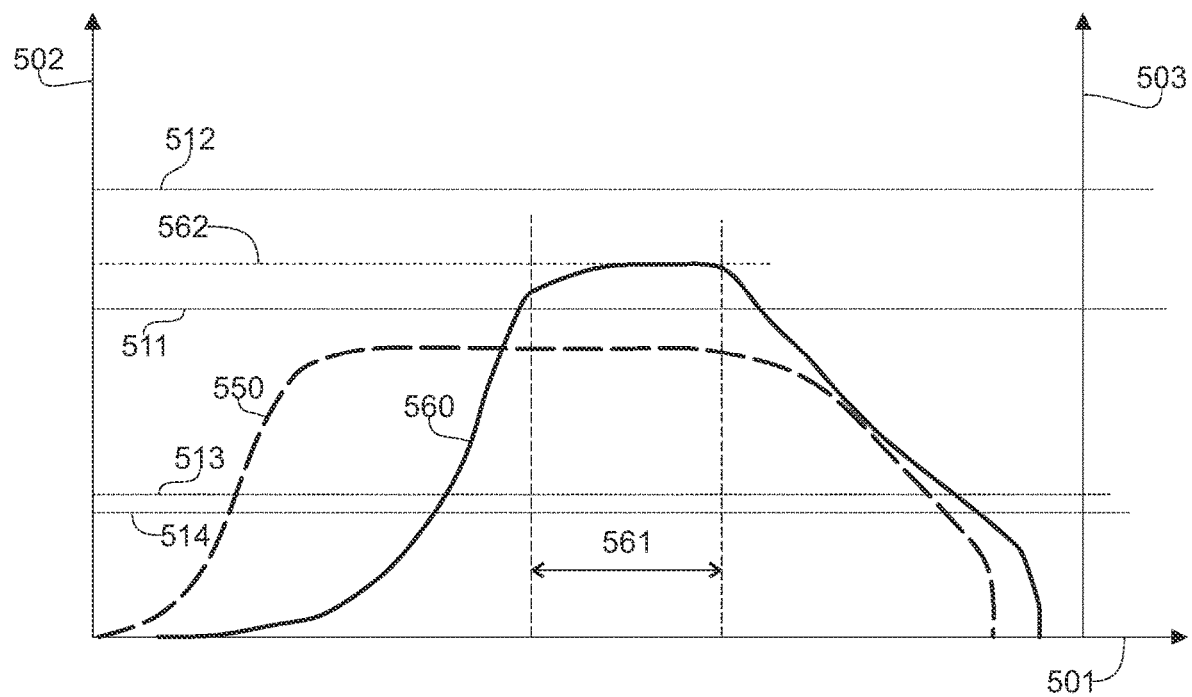
FIG. 5 shows a qualitative example of a pressure-temperature cycle for carrying out the consolidation of a skin and the assembly of a stiffener thereon.

FIG. 5 the tooling is placed in an oven. In a time (501), temperature (502) and pressure (503) diagram, the temperature of the tooling (560), measured by the temperature probe, is brought to a temperature (562) higher than a melting point of the first thermoplastic polymer (511) which the matrix of the skin is made of, but lower than a melting point of the second thermoplastic polymer (512) making the matrix of the stiffeners, while maintaining the vacuum pressure (550) in the enclosure delimited by the tarpaulin.

For example, if the first thermoplastic polymer is a LMPAEK® and the second thermoplastic polymer is a PEEK, the maximum heating temperature during the consolidation—assembly operation is 335° C.

According to embodiment variants (not shown), the tooling may comprise autonomous heating means by electrical resistance or by induction, without these examples being exhaustive, and may also comprise cooling means e.g. by a circulation of a heat transfer fluid in ducts implemented in the tooling.

The skin is held under pressure (550) against the tooling and the flanges of the stiffeners at the selected temperature for a period (561) comprised between 5 and 10 minutes depending on the dimensions of the panel.

The assembly is then cooled, either by removing the tooling from the oven or, if provided with, by using the cooling means while maintaining the pressure at least until the temperature reaches a temperature that is both below a glass transition temperature of the first thermoplastic polymer (513) and below a glass transition temperature of the second thermoplastic polymer (514).

The set comprising the consolidated skin and the stiffeners integrated into said skin to form a stiffened panel may then be unmolded.

The melting temperatures and, where applicable, the thermal degradation temperatures of the thermoplastic polymers constituting the matrices of the skin and of the stiffener may be obtained from the technical data sheets of the polymers or prepregs given by their respective suppliers.

Figure 6:
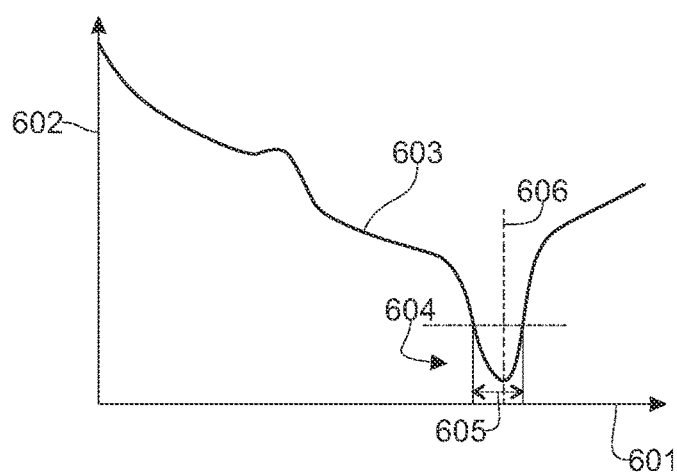
FIG. 6 shows an example of a differential thermal analysis curve of a sample of a thermoplastic polymer.

FIG. 6 the melting temperature ranges may also be obtained by tests known from the prior art, in particular by differential thermal analysis tests. The curve (603) is obtained by subjecting a sample of a polymer and a reference sample to a thermal cycle and measuring the difference in the amount of heat (602) required to increase the temperatures of the sample and of the reference as a function of the temperature (601). This method is well known from prior art and is not detailed further.

For a crystalline or semi-crystalline polymer, the endothermic peak (604) corresponds to the melting of the polymer, the apex of the peak (606) gives the melting point and the polymer melting temperature range is given by the width (605) of the peak (604) at mid-height. Thus, this type of test carried out on the first and second thermoplastic polymer makes it possible to determine, at least as starting data, the temperatures for the implementation of the method. These data may then be refined by trials.

Figure 7:
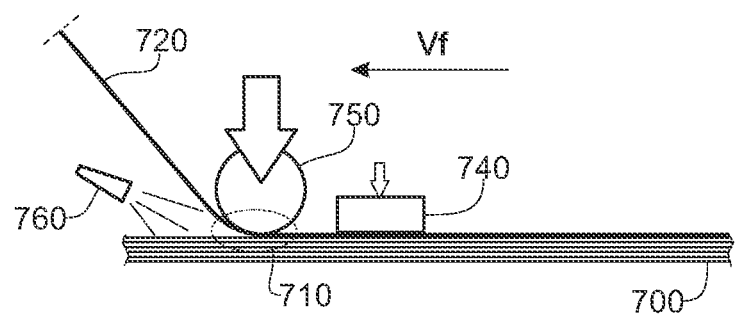
FIG. 7 shows, according to a diagrammatic sectional view, a material deposition by automated fiber placement.

For an amorphous polymer, the melting peak and the glass transition peak are not differentiable, after the glass transition peak the polymer fluidity increases continuously with temperature until the thermal degradation temperature is reached, FIG. 7 the method of the invention may advantageously implement a layup technique by automated fiber placement of fibers pre-impregnated with the appropriate thermoplastic polymer to obtain both the preform of the stiffener and the preform of the skin.

A strip of fibers (720) pre-impregnated with the thermoplastic polymer making the matrix of the future composite and comprising 1 to 15 fibers depending on the complexity of the trajectory, is laid up on a laminate of plies (700) made during a previous layup.

During the layup, the interface at the deposition site (710) between the strip of fibers (720) being laid up and the exposed surface of the laminate (700) may be heated so as to melt the thermoplastic polymer pre-impregnating the strip of fibers and the surface of the laminate, using heating means (760) such as a laser beam.

The strip of fibers (720) is immediately pressed by pressing means (750) on the laminate (700), for example by means of a pressure roller.

Under the effect of this pressure and temperature, the strip of fibers (720) is bound to the laminate (700). The pressure roller (750) and the heating means (760) are moving at a speed Vf as layup proceeds, while tensioning means (not shown) ensure permanent tensioning of the undeposited portion of the strip of fibers (720). Cooling means (740) moving with the pressure roller rapidly cool the deposited strip which is thus bound to the laminate.

Figure 8:
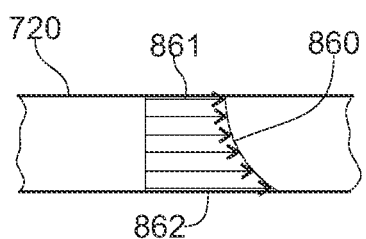
FIG. 8 represents a temperature profile at the deposition site in a strip of fibers deposited by the material deposition method shown in FIG. 7.

FIG. 8 the heating means are selected and adjusted so that a temperature profile (860) in the thickness of the strip of fibers (720) at the interface between the strip of fibers and the laminate deposited during a previous passage, reaches an interface temperature (862) comprised within a temperature range of 5° C. to 10° C. higher than a melting temperature of the thermoplastic polymer impregnating the strip of fibers, while the temperature on the opposite side (861) of the strip of fibers reaches the melting point of the impregnation polymer.

Returning to FIG. 7, by adjusting the feed rate Vf to a sufficient speed comprised between 5 m·min$^{-1}$ and 60 m·min$^{-1}$ and currently close to 30 m·min$^{-1}$, the strip of fibers (720) strongly adheres to the laminate (700) without the occurrence of an autohesion phenomenon between the deposited strip of fibers (720) and the laminate (700).

Thus, the preform obtained by this fiber placement method is not consolidated but has a very low porosity content, i.e., less than 2%.

By way of example, the interface temperature (862) when depositing strips of fibers (720) pre-impregnated with PEEK is commonly comprised between 353° C. and 358° C., between 405° C. and 410° C. for a strip of fibers pre-impregnated with PEKK (polyetherketoneketone), between 375° C. and 380° C. for a strip of fibers pre-impregnated with PEK (polyetherketone) and between 309° C. and 314° C. for a strip of fibers pre-impregnated with LMPAEK®.

Figure 9:
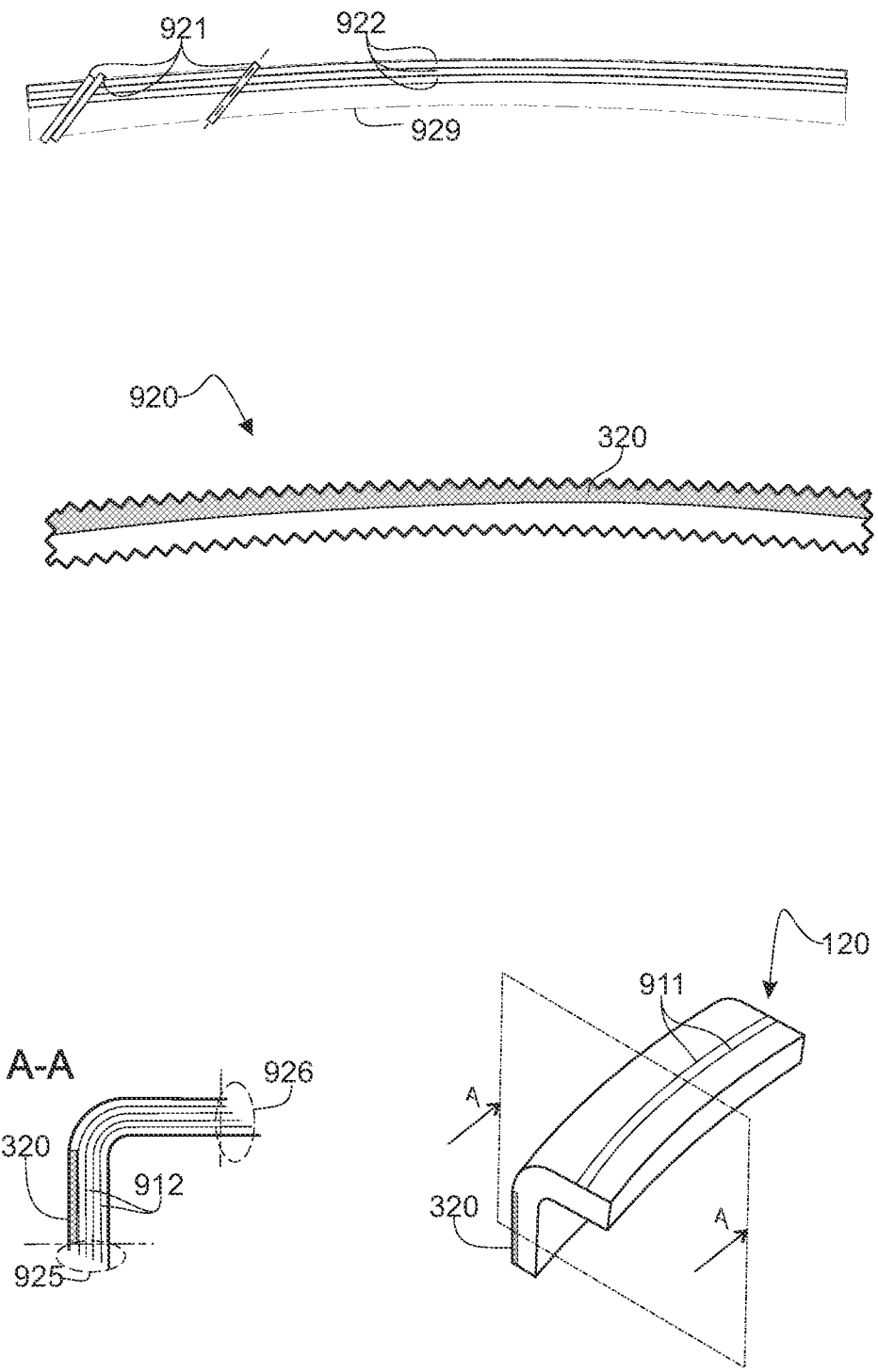
FIG. 9 illustrates the different manufacturing steps of a stiffener for implementing the method of the invention.

FIG. 9 according to an exemplary embodiment, the preform of the stiffener may also be obtained according to the layup method described above.

To this end, strips of fibers (921, 922) pre-impregnated with the second thermoplastic polymer are deposited by automated fiber placement and oriented with respect to the actual contour (929) of the preform.

Thus, the strips of fibers (922) oriented at 0° locally follow a direction of curvature of the preform. For this purpose, said strips of fibers (922) may be deposited along curved trajectories, which is enabled by the automated fiber placement method and means.

Strips of fibers (921) oriented in other directions, for example at 45°, may also be laid up by automated fiber placement so as to locally conform to such a direction.

Thus, the preform of the stiffener (920) is flat, cohesive and rigid and can be easily handled.

A layer (320) of the first thermoplastic polymer is deposited on the part of the preform intended to make a stiffener flange.

According to exemplary embodiments, this layer is laid up by automated fiber placement of fibers pre-impregnated with the first thermoplastic polymer or by manually depositing and welding a film of the first polymer on an appropriate area of the preform (920) after draping. The preform (920) being flat, this last operation is simplified.

To obtain the stiffener, the preform (920) is brought to a temperature higher than a melting point of the second thermoplastic polymer but lower than a thermal degradation temperature of the first thermoplastic polymer.

Such a heating may be carried out, for example, by means of radiant panels while the preform is held and positioned in a transfer tooling as described in co-pending U.S. application Ser. No. 18/376,114, making it possible to precisely locate the layer (320) of the first thermoplastic polymer with respect to said transfer tool and consequently with respect to a stamping tool.

The preform may then be hot-stamped between a punch and a die according to a stamping method known from the prior art, in order to obtain the stiffener (120).

The stamping method implements inter-laminar slippage and polymer percolation phenomena between the plies and ends up with a step of compaction-consolidation between the punch and the die of the shaped part. All these operations may be carried out in a single stroke of the punch.

At the end of the stamping operation, a stiffener blank is obtained comprising a fully compacted and consolidated shape, with a porosity content less than 0.5%, and non-compacted areas (925, 926) close to the edges that show signs of interlaminar slippage. These non-compacted areas are removed by trimming using abrasive water jet or with a cutting router.

The stiffener (120) is completed at the end of the trimming process. The reinforcements oriented at 0° (911) follow the curvature of the stiffener, while the reinforcements oriented at an angle (912) with respect to this direction, extend from one edge to another of the stiffener and extend into the wings of the stiffener.

The implementation of the automated fiber placement method for the manufacturing of the preform, means that the fibrous reinforcements are already correctly oriented in the preform before stamping and are therefore subjected to reduced stresses during shaping and maintain their nominal direction within a narrow tolerance.

The layer (320) of the first thermoplastic polymer is perfectly positioned in the stiffener flange.

According to an exemplary embodiment, the stiffeners thus obtained are placed in the shape of the tooling so that the face of their flange is flush with the molding surface and the preform of the skin which may be laid up/by automated fiber placement, according to the method described above, on the molding surface and on the flanges of the stiffeners.

Example 2: Spar

Figure 10:
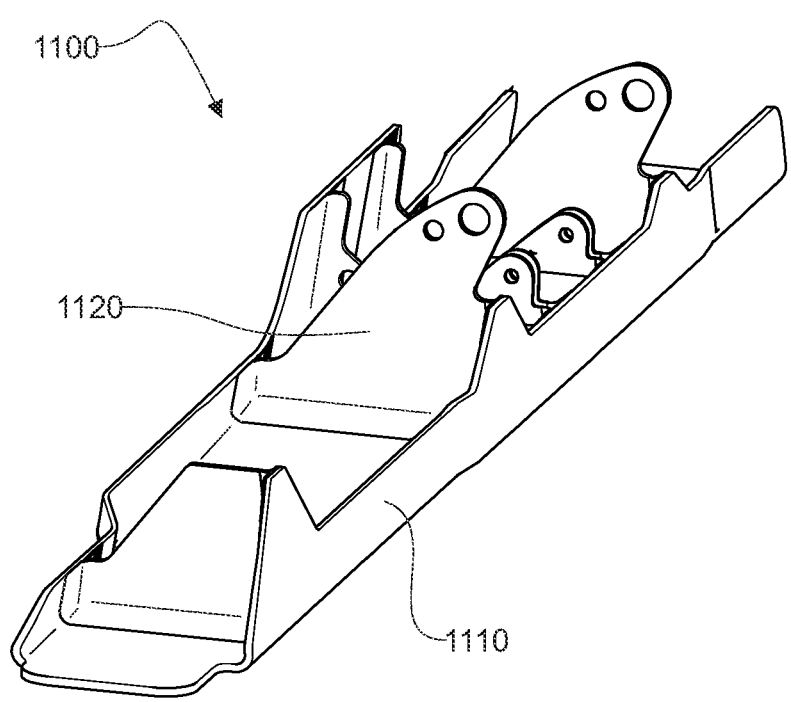
FIG. 10 shows according to a perspective view an exemplary embodiment of a spar manufactured by the method of the invention.

FIG. 10 according to another example of implementation, the method is used for the manufacturing of a wing spar (1100). This embodiment is also applicable to the manufacture of a frame for the transverse stiffening of an aircraft fuselage.

According to this exemplary embodiment, the spar (1100) comprises a substrate part in the form of a profile (1110) with a substantially U-shaped cross section comprising one or more stiffeners (1120) connected to the web and to the wings of the profile (1100) inside the U.

Such a spar is for example used in a wing element and supports for example a mobile aircraft wing element such as a leading-edge tilting nose, commonly referred to as a slat.

According to an exemplary embodiment, the stiffeners (1120) may have both a structural function of stiffening the structure and a technical function as a clevis for the mounting of equipment such as jacks for maneuvering the leading-edge tilting nose.

Figure 13:
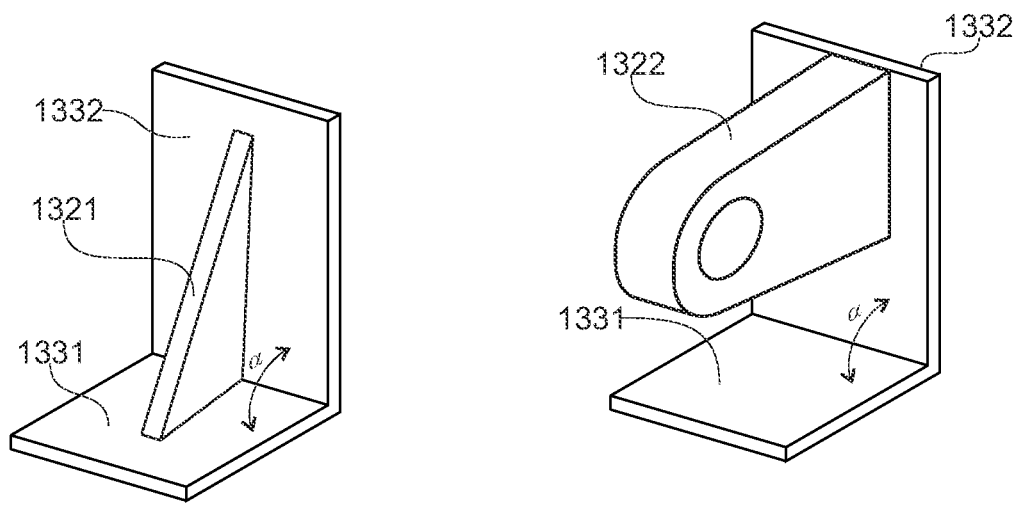
FIG. 13 shows in perspective views examples of stiffeners configured to be integrated in a U shape profile.

FIG. 13 the stiffener may comprise at least two flanges (1331, 1332) at least one of these flanges being intended to be integrated with the profile, and a member (1321, 1322) such as a rib or a web extending from at least one of the flanges (1331, 1332) of the stiffener and integral with this flange.

The two flanges (1331, 1332) may be perpendicular to each other or oriented at any angle α, commonly comprised between 45° and 135° relative to each other in accordance with the shape of the profile they are integrated with.

According to an exemplary embodiment implementing the method of the invention, the U-shaped profile (1110) may be made of a composite laminate with continuous fiber reinforcement in a thermoplastic polymer matrix consisting of a first thermoplastic polymer for example LMPAEK®.

The preform of said profile is obtained by automated fiber placement of fibers pre-impregnated with a first thermoplastic polymer according to different implementation variants exposed hereunder.

Figure 11:
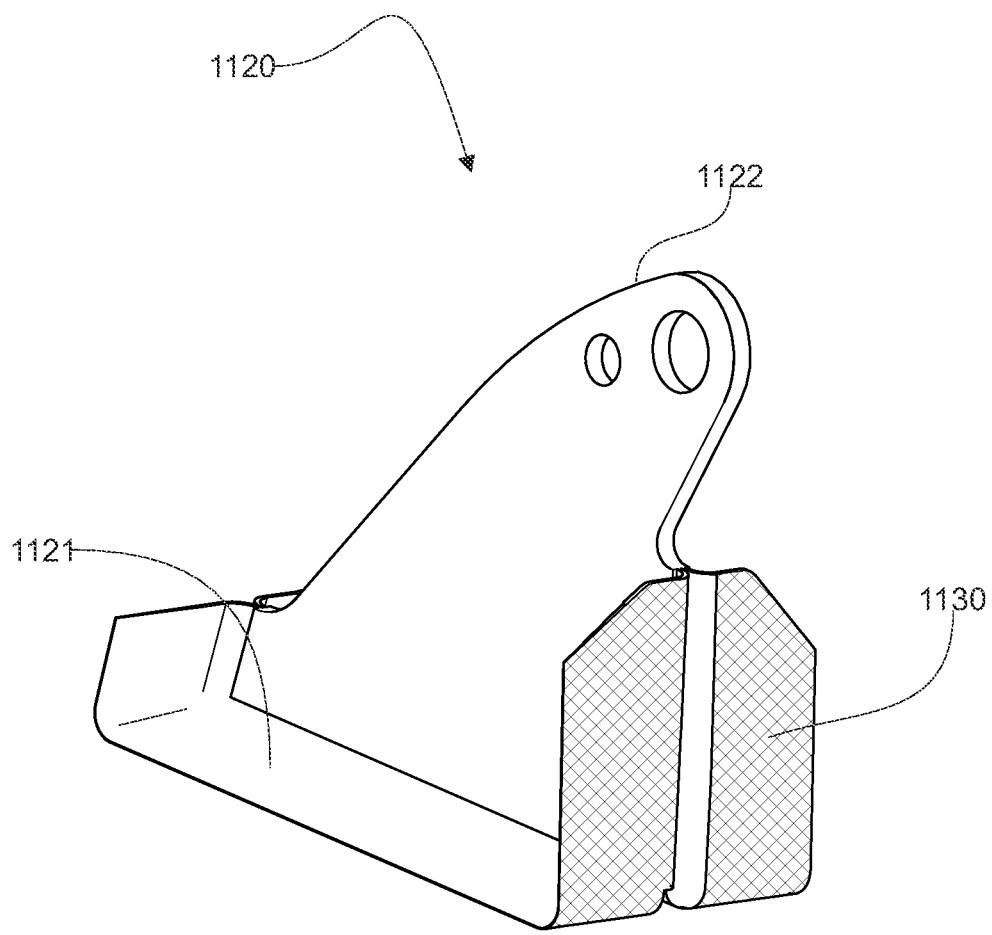
FIG. 11 is a perspective view of a stiffener of the spar of FIG. 10

FIG. 11 according to an exemplary embodiment a stiffener (1120) may comprise a functional web (1121) and flanges (1122) extending in 3 planes corresponding to the inner section of the profile.

According to an exemplary embodiment, the stiffener may be made of a fiber-reinforced composite comprising short or long fibers in a thermoplastic polymer matrix made of a second thermoplastic polymer, like a PEEK, for example.

According to an exemplary implementation of this embodiment, the stiffener may be obtained by plastic injection molding.

According to another embodiment, the stiffener may be obtained by additive manufacturing.

According to yet another embodiment, the stiffener may be obtained by a molding-thermocompression method such as described in document FR 2 923 179.

According to another exemplary embodiment, the stiffener may be made of a composite comprising continuous reinforcing fibers in a thermoplastic polymer matrix made of a second thermoplastic polymer, like a PEEK, for example.

According to this other exemplary embodiment, the stiffener may for example be obtained by a method of consolidation in shape of pre-impregnated plies according to a method as described in document EP 2 401 136/U.S. Pat. No. 8,721,830.

Regardless of the method of implementation, the stiffener comprises on the faces of its flanges coming into contact with the wings of the U-shaped profile, a layer (1130) comprising the first thermoplastic polymer.

Depending on the embodiments, this layer includes reinforcements in the form of short fibers, long fibers or continuous fibers.

By way of non-limiting examples, said layer (1130) may be obtained by overmolding on the stiffener or by inserting a non-reinforced sheet of the first thermoplastic polymer or even a fibrous ply pre-impregnated with the first thermoplastic polymer onto the laminate.

Figure 12A:
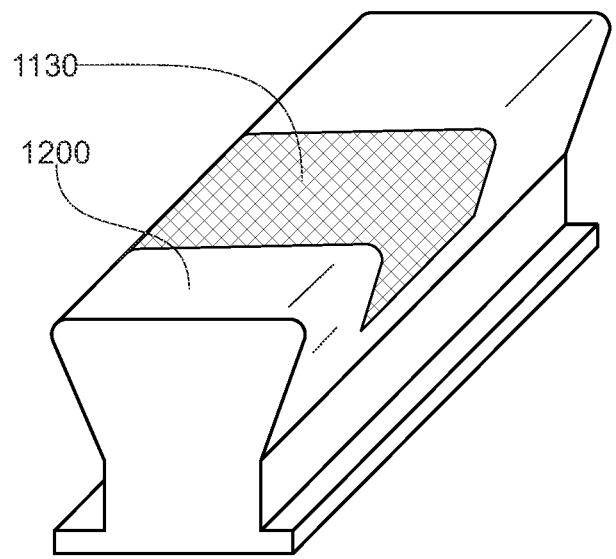
FIG. 12A shows in a schematic perspective view an example of tooling for making the preform of a spar made by the method of the invention.

FIG. 12A according to an exemplary embodiment, the preform of the U-shaped profile is obtained by automated fiber placement of pre-impregnated fibers of the first thermoplastic polymer on a mandrel (1200) reproducing the inner section of the U. According to this non-limiting exemplary embodiment, the section of the U comprises a pinching of the branches of the U.

For example, the mandrel (1200) may be made of an INVAR® type of Nickel and Iron alloy.

According to an embodiment, the mandrel (1200) comprises pockets for placing and holding in position one or more stiffeners so that their flanges, comprising the layer of the first polymer (1130), are flush with a molding surface of the mandrel.

Figure 12B:
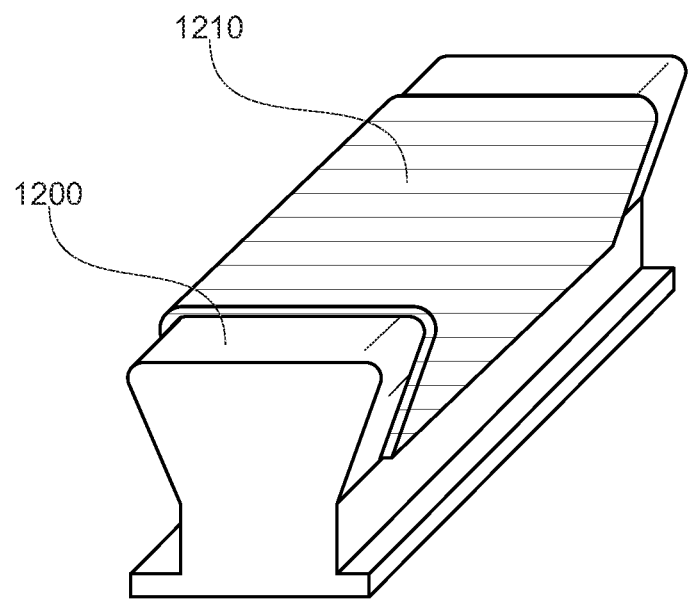
FIG. 12B shows the tooling of FIG. 12A during the draping of the spar preform made by the method of the invention.

FIG. 12B the preform of the U-shaped profile (1210) is laid up into shape without consolidation by placing fibers under the conditions explained above for the stiffened panel on the mandrel (1200) comprising the stiffener.

The assembly may then be consolidated in an appropriate tooling. According to an embodiment the consolidation may be carried out in an oven or in an autoclave using the mandrel (1200) as a tooling and subjecting the whole to a pressure-temperature cycle as shown in FIG. 5.

Figure 12C:
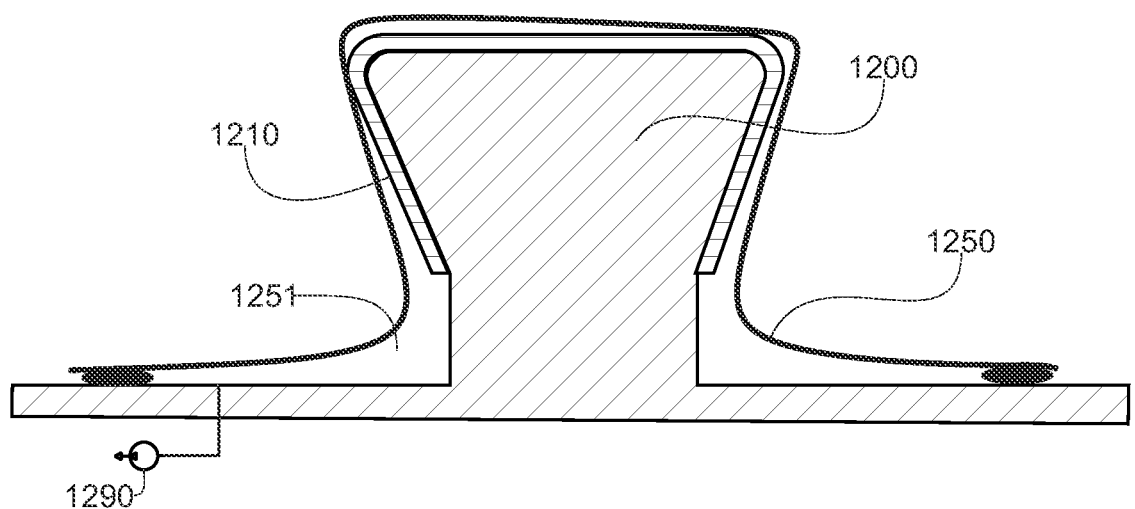
FIG. 12C shows according to a diagrammatic sectional view, a tooling adapted to the consolidation of a substrate part of the spar type.

FIG. 12C, to this end the tooling (1200) holding the stiffeners and the unconsolidated profile preform (1210) is bagged in a tight tarp (1250) thus delimiting a sealed enclosure (1251) comprising the whole assembly.

The sealed enclosure (1251) may be evacuated by pumping means (129), the set may then be placed in an oven or an autoclave to perform the thermomechanical consolidation cycle. When placed in an oven the pressure in the enclosure results from and is limited to, though in most applications high enough, the vacuum in the sealed enclosure. When set in an autoclave, additional pressure may be applied during the consolidation.

Alternatively, the preform may be laid up by automated fiber placement on a mandrel that does not include the stiffeners and the stiffeners are placed in contact with the preform during a consolidation step using a suitable tooling.

Regardless of the embodiment, one or more films of the first polymer may be placed between the stiffener flanges and the U profile preform.

A person skilled in the art understands that in a variant of the method, the stiffeners may be placed not between the wings of the U-section but on the opposite side of the flanges of the U-section, in particular to create brackets or cleats.

Selection of the Materials

The previous examples use a LMPAEK® for the first polymer and a PEEK for the second polymer.

Other combinations are possible as long as the following conditions are met:

there is a temperature, or temperature range, within or above a melting temperature range of the first polymer, but below a melting temperature range of the second polymer;

a thermal degradation temperature of the first polymer is above the melting temperature range of the second polymer, and the first polymer is miscible in the second polymer.

The following table gives examples of polymers selection allowing the implementation of the method of the invention:

TABLE 1

| First polymer | Second polymer |
| --- | --- |
| LMPAEK ® | PEEK |
| LMPAEK ® | PEKK |
| PEI | PEEK |
| PEI | PEKK |
| PEI | LMPAEK ® |

With PEKK: polyetherketone-ketone having a melting temperature range comprised between 310° C. and 370° C. and a melting point of 360° C., a thermal degradation temperature of 450° C.; PEI: Polyetherimide, amorphous polymer with a glass transition temperature range comprised between 215° C. and 230° C. and a thermal degradation temperature of 530° C.

The description above and the exemplary embodiments show that the invention achieves the intended objective and allows an economical and quick manufacturing of a thermoplastic polymer matrix composite part with high thermal and mechanical performance comprising integral stiffeners.

The invention claimed is:

1. A method for manufacturing a composite part comprising a fibrous reinforcement and a thermoplastic polymer matrix, the composite part comprising:

a substrate part made of a composite material comprising a continuous fibrous reinforcement in a matrix made of a first thermoplastic polymer having a first melting point comprised in a first melting temperature range; and a stiffener integral with the substrate part, made of a fibrous-reinforced composite material in a matrix made of a second thermoplastic polymer, the stiffener comprising at least one flange and at least one web, the second thermoplastic polymer having a second melting point comprised in a second melting temperature range; wherein:
the second melting point is higher than the first melting point; and
the first thermoplastic polymer is miscible with the second thermoplastic polymer at the second melting point;
the method comprising the steps of:
I) obtaining a non-consolidated preform of the substrate part;
II) obtaining a preform of the stiffener comprising a layer comprising the first thermoplastic polymer at a location of a flange of the stiffener configured to be in contact with the substrate part;
III) placing and assembly of the non-consolidated preform of the substrate part and the preform of the stiffener contacting the substrate part in a tooling comprising a molding surface reproducing a shape of the substrate part and comprising means for positioning the stiffener relative to the molding surface; and
IV) subjecting the assembly to a consolidation thermo-mechanical cycle comprising heating under pressure up to a first temperature that is higher than the first melting temperature range but lower than the second melting temperature range in order to consolidate the preform of the substrate part and to weld the flange of the stiffener on the substrate part.

2. The method of claim 1, wherein the first thermoplastic polymer is of a Low Melting Polyaryletherketone type (LMPAEK®) and the second thermoplastic polymer is of a Polyetheretherketone (PEEK) type.

3. The method of claim 2, wherein the first melting temperature range is comprised between 285° C. and 320° C., the second melting temperature range is comprised between 294° C. and 354° C., and the second melting point is 343° C.

4. The method of claim 3, wherein the first temperature is 335° C.

5. The method of claim 1, wherein the first thermoplastic polymer is of the LMPAEK® type and the second thermoplastic polymer is of a Polyetherketoneketone (PEKK) type.

6. The method of claim 1, wherein the first polymer is of a Polyetherimide (PEI) type and the second polymer is chosen among PEKK, LMPAEK® and PEEK.

7. The method of claim 1, wherein step III) comprises interposing a film comprising the first thermoplastic polymer between the stiffener flange and the preform of the substrate part.

8. The method of claim 1, wherein the fibrous reinforcement of the stiffener comprises fibers selected among continuous fibers, long fibers and short fibers.

9. The method of claim 1, wherein the stiffener preform is obtained by a method selected from injection molding, additive manufacturing, and thermo-compression.

10. The method of claim 1, wherein the substrate part is a skin and the stiffener is a profile, wherein integration of the stiffener with the skin making a stiffened panel.

11. The method of claim 1, wherein the substrate part is a profile having a U-shaped cross section and the stiffener comprises at least two flanges, at least one of these two flanges being configured to be integrated with the profile, and a member extending from at least one of the at least two flanges of the stiffener and integral with this flange.

12. The method of claim 1, wherein step I) comprises a layup by automated fiber placement of fibers pre-impregnated with the first thermoplastic polymer on the molding surface of the tooling so as to obtain the non-consolidated preform of the substrate part.

13. The method of claim 12, wherein the layup by automated fiber placement of pre-impregnated fibers of with first thermoplastic polymer is carried out while the preform of the stiffener is held in the means for positioning the stiffener relative to the molding surface so that the flange of the stiffener configured to be in contact with the substrate part is flush with the molding surface.

14. The method of claim 1 wherein step II) comprises the steps of:
obtaining a non-consolidated preform of the stiffener;
integrating a layer made of the first thermoplastic polymer into the non-consolidated preform of the stiffener at a location of a flange of the stiffener configured to be in contact with the substrate part; and
consolidating the non-consolidated preform of the stiffener comprising the layer made of the first thermoplastic polymer, thus obtaining the preform of the stiffener.

15. The method of claim 1, wherein step II) comprises the step of:
a layup of a non-consolidated preform of the stiffener by automated fiber placement; and
hot-stamping the non-consolidated preform of the stiffener and consolidating the preform of the stiffener during the stamping, thus obtaining the preform of the stiffener.

16. The method of claim 15, wherein the flat layup step of the non-consolidated preform of the stiffener comprises the layup of a ply comprising fibers pre-impregnated with the first thermoplastic polymer.

* * * * *